United States Patent
Nagai et al.

(10) Patent No.: US 8,475,580 B2
(45) Date of Patent: Jul. 2, 2013

(54) INK, INK CARTRIDGE, INK JET RECORDING METHOD AND INK JET RECORDING APPARATUS

(75) Inventors: Souichi Nagai, Kawasaki (JP); Masashi Ogasawara, Machida (JP); Keigo Gouda, Kawasaki (JP); Fumiaki Fujioka, Kawasaki (JP); Akiko Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 13/176,138

(22) Filed: Jul. 5, 2011

(65) Prior Publication Data

US 2012/0033012 A1    Feb. 9, 2012

(30) Foreign Application Priority Data

Aug. 3, 2010  (JP) ................................. 2010-174066

(51) Int. Cl.
*C09D 11/02* (2006.01)

(52) U.S. Cl.
USPC ..................................... 106/31.89; 106/31.86

(58) Field of Classification Search
USPC .......................................... 106/31.89, 31.86
See application file for complete search history.

(56) References Cited

U.S. PATENT DOCUMENTS

| | | | |
|---|---|---|---|
| 5,835,116 A | 11/1998 | Sato et al. | |
| 6,027,210 A | 2/2000 | Kurabayashi et al. | |
| 6,210,473 B1 * | 4/2001 | Boils et al. | 106/31.43 |
| 6,238,045 B1 | 5/2001 | Ono et al. | |
| 6,280,513 B1 | 8/2001 | Osumi et al. | |
| 6,398,355 B1 | 6/2002 | Shirota et al. | |
| 6,412,936 B1 | 7/2002 | Mafune et al. | |
| 6,733,120 B2 | 5/2004 | Ogasawara et al. | |
| 7,005,461 B2 | 2/2006 | Sanada et al. | |
| 7,160,376 B2 | 1/2007 | Watanabe et al. | |
| 7,267,717 B2 | 9/2007 | Watanabe et al. | |
| 7,276,112 B2 | 10/2007 | Tokuda et al. | |
| 7,297,203 B2 | 11/2007 | Takada et al. | |
| 7,371,274 B2 | 5/2008 | Sanada et al. | |
| 7,377,631 B2 | 5/2008 | Takada et al. | |
| 7,601,210 B2 | 10/2009 | Fujioka et al. | |
| 7,605,192 B2 | 10/2009 | Sanada et al. | |
| 7,699,924 B2 | 4/2010 | Mafune et al. | |
| 7,705,071 B2 | 4/2010 | Nakagawa et al. | |

(Continued)

FOREIGN PATENT DOCUMENTS

| | | |
|---|---|---|
| JP | 2000-198955 A | 7/2000 |
| JP | 2006-089735 A | 4/2006 |

(Continued)

*Primary Examiner* — Kaj K Olsen
*Assistant Examiner* — Veronica F Faison
(74) *Attorney, Agent, or Firm* — Fitzpatrick, Cella, Harper & Scinto (57) ABSTRACT

An ink jet ink including a self-dispersible pigment, a salt, a polyoxyethylene alkyl ether and a water-soluble organic solvent. The self-dispersible pigment is a pigment to a surface of a particle of which a functional group containing at least a phosphonic acid group is bonded, the introduced amount of the functional group bonded to the self-dispersible pigment is 0.10 to 0.33 mmol/g. The salt is constituted by combining a specific cation with a specific anion. The value (Concentration of anion)×(Valence number of anion) of the salt in the ink is 0.005 to 0.06 mol/L. The water-soluble organic solvent includes glycerol, the content of which in the ink is 35% to 78% by mass based on the total content of the water-soluble organic solvent in the ink.

9 Claims, 1 Drawing Sheet

U.S. PATENT DOCUMENTS

| | | |
|---|---|---|
| 7,753,515 B2 | 7/2010 | Tokuda et al. |
| 7,806,970 B2 | 10/2010 | Fujioka et al. |
| 7,883,199 B2 | 2/2011 | Hakamada et al. |
| 7,909,448 B2 | 3/2011 | Iwata et al. |
| 8,007,097 B2 | 8/2011 | Sanada et al. |
| 2007/0100024 A1* | 5/2007 | Gu et al. ................ 523/160 |
| 2008/0018722 A1* | 1/2008 | Mafune et al. ............. 347/100 |
| 2009/0229489 A1* | 9/2009 | Gu ...................... 106/31.75 |
| 2009/0258145 A1 | 10/2009 | Mukae et al. |
| 2010/0033522 A1 | 2/2010 | Saito et al. |

FOREIGN PATENT DOCUMENTS

| | | |
|---|---|---|
| JP | 2008-001891 A | 1/2008 |
| JP | 2009-515007 A | 4/2009 |
| WO | 2007/053564 A2 | 5/2007 |

* cited by examiner

INK, INK CARTRIDGE, INK JET RECORDING METHOD AND INK JET RECORDING APPARATUS

BACKGROUND OF THE INVENTION

1. Field of the Invention

The present invention relates to an ink, an ink cartridge, an ink jet recording method and an ink jet recording apparatus.

2. Description of the Related Art

In recent years, an ink used for an ink jet recording method has been required to still more improve the image density and bleeding resistance of a recorded image. Among recording media on which an image is recorded, various kinds of plain paper, which are different in ink permeability, are available, and the difference in ink permeability affects image characteristics. In particular, a recording medium high in ink permeability tends to lower the image density of an image formed and also lower the bleeding resistance. In recent years when the ink jet recording method has been widely used; accordingly, an image formed thereby has been required to reconcile the above-described performance characteristics at a high level, irrespective of the kind of the recording medium including such a recording medium high in permeability.

In order to meet the above requirement, there is a proposal for improving the image density by an ink containing a self-dispersible pigment to the surfaces of particles of which a functional group high in reactivity to calcium is bonded on the basis of a calcium index that is an index of reactivity to calcium (see Japanese Patent Application Laid-Open No. 2009-515007). There are also proposals for improving the image density and bleeding resistance by an ink containing a self-dispersible pigment to the surfaces of particles of which a functional group such as a carboxylic acid group is bonded and a salt (see Japanese Patent Application Laid-Open No. 2000-198955, Japanese Patent Application Laid-Open No. 2008-001891 and Japanese Patent Application Laid-Open No. 2006-089735). Japanese Patent Application Laid-Open No. 2008-001891 and Japanese Patent Application Laid-Open No. 2006-089735 describe that the image density of a recorded image can be improved by more increasing the density of the functional group on the surfaces of the pigment particles.

SUMMARY OF THE INVENTION

As described above, the various proposals for improving image characteristics such as image density and bleeding resistance have been made on ink jet inks. On the other hand, however, the present inventors have recognized that sufficiently excellent characteristics need to be satisfied even from the viewpoint of the reliability thereof. For example, it has been found that although improvement in image density is expected to some extent by using the self-dispersible pigment described in Japanese Patent Application Laid-Open No. 2009-515007, there is room for still more improvement in the bleeding resistance, and it is impossible to give an excellent image density irrespective of the kind of a recording medium used. Thus, the present inventors have paid attention to the feature that a salt for accelerating aggregation of a pigment is contained in ink for satisfying the above-described characteristics when the self-dispersible pigment described in Japanese Patent Application Laid-Open No. 2009-515007 is used, and to the kind and content of a water-soluble organic solvent, to pursue an investigation. However, it has been found that when such a self-dispersible pigment is used, the storage stability of the resulting ink may be lowered in some cases according to the kinds and contents of the salt and water-soluble organic solvent used in combination. It has also been found that reliability becomes insufficient due to the fact that the ink is retained in a cap for capping a recording head provided in an ink jet recording apparatus. It has further been found that although the inks described in Japanese Patent Application Laid-Open No. 2000-198955, Japanese Patent Application Laid-Open No. 2008-001891 and Japanese Patent Application Laid-Open No. 2006-089735 are at such a level as to cause no problem as to the reliability such as storage stability of the inks and retention of the inks in the cap, the image density needs to be further improved. Incidentally, the cap for capping the recording head provided in the ink jet recording apparatus is referred to as "cap" merely.

Accordingly, it is an object of the present invention to provide a novel ink capable of achieving both the reliability of the ink and image characteristics. More specifically, the object is to provide an ink capable of achieving both the reliability of the ink that the retention of the ink in the cap is inhibited, and the storage stability of the ink is excellent, as well as the image characteristics that an image excellent in image density and bleeding resistance can be recorded. Another object of the present invention is to provide an ink cartridge, an ink jet recording method and an ink jet recording apparatus using this ink, by which the reliability of the ink is ensured, and an image excellent in image density and bleeding resistance can be stably provided.

The above objects can be achieved by the present invention described below. More specifically, an ink according to the present invention is an ink jet ink comprising a self-dispersible pigment, a salt, a polyoxyethylene alkyl ether and a water-soluble organic solvent, wherein the self-dispersible pigment is a pigment to the surface of a particle of which a functional group containing at least a phosphonic acid group is bonded, the introduced amount of the functional group bonded to the self-dispersible pigment is 0.10 mmol/g or more and 0.33 mmol/g or less, the salt is constituted by combining at least one cation selected from the group consisting of alkali metal ion, ammonium ion and organic ammonium ion with at least one anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$ and $H_2PO_4^-$, the value (Concentration of anion)×(Valence number of anion) of the salt in the ink is 0.005 mol/L or more and 0.06 mol/L or less, the water-soluble organic solvent includes glycerol, and the content of the glycerol in the ink is 35% by mass or more and 78% by mass or less based on the total content of the water-soluble organic solvent in the ink.

The present invention also provides an ink cartridge comprising an ink and an ink storage portion storing the ink, wherein the ink is the ink described above.

The present invention further provides an ink jet recording method comprising a step of ejecting an ink from an ejection orifice of a recording head of an ink jet system to record an image on a recording medium, and a step of capping the ejection orifice of the recording head with a cap, wherein the ink is the ink described above.

The present invention still further provides an ink jet recording apparatus comprising an ink storage portion storing an ink, a unit for ejecting the ink from an ejection orifice of a recording head of an ink jet system to record an image on a recording medium and a cap for capping the ejection orifice of the recording head, wherein the ink is the ink described above.

According to the present invention, there can be provided a novel ink capable of achieving both the reliability of the ink and image characteristics. More specifically, according to the ink of the present invention, the reliability of the ink that the ink retention in the cap is inhibited, and the storage stability of the ink is excellent, as well as the image characteristics that an image excellent in image density and bleeding resistance can be recorded can be reconciled. According to another embodiment of the present invention, there are provided an ink cartridge, an ink jet recording method and an ink jet recording apparatus using this ink, by which the reliability of the ink is ensured, and an image excellent in image density and bleeding resistance can be stably provided.

Further features of the present invention will become apparent from the following description of exemplary embodiments with reference to the attached drawing.

BRIEF DESCRIPTION OF THE DRAWING

FIGURE typically illustrates a cleaning portion of an ink jet recording apparatus.

DESCRIPTION OF THE EMBODIMENTS

Figure 1:
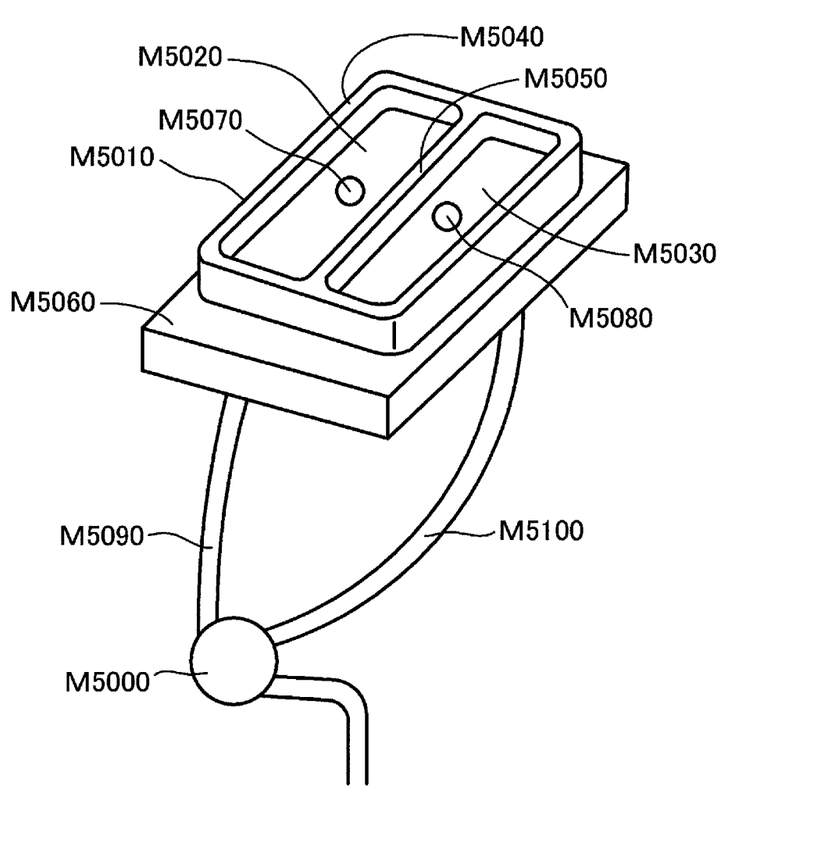

Preferred embodiments of the present invention will now be described in detail in accordance with the accompanying drawing. Incidentally, in the following description, an ink jet ink may be abbreviated as "ink" merely. The pigment having a phosphonic acid group in the structure of the functional group may be described as "phosphonic acid type self-dispersible pigment". In the present invention, various physical property values are values at 25° C. unless expressly noted.

According to an investigation by the present inventors, it has been found that when a phosphonic acid type self-dispersible pigment is used as a coloring material of an ink, the storage stability of the ink tends to be affected by the pH of the ink or water-soluble organic solvents and salts in the ink. This is attributable to the fact that the phosphonic acid group in the structure of the pigment has a plurality of pKa values, which lie within a general pH range of the ink, so that the dispersion stability of the pigment, i.e., the storage stability of the ink, becomes sensitive to the pH of the ink, the water-soluble organic solvents and salts. In short, the storage stability of the ink containing the phosphonic acid type self-dispersible pigment tends to be affected by the pH and the composition of the ink.

An investigation by the present inventors has revealed that the retention of ink in a cap is inhibited, the storage stability of ink is made excellent, and an image excellent in image density and bleeding resistance can be provided, by the constituent features of the ink as described below, thus leading to completion of the present invention. The ink according to the present invention, by which such an effect is achieved, is characterized by the following constitution. More specifically, the ink is characterized by containing a self-dispersible pigment to the surface of a particle of which a functional group containing at least a phosphonic acid group is bonded, a specific salt, a polyoxyethylene alkyl ether and a plurality of water-soluble organic solvents including glycerol. The ink requires that the introduced amount of the functional group bonded to the self-dispersible pigment is 0.10 mmol/g or more and 0.33 mmol/g or less, and the value (Concentration of anion)×(Valence number of anion) of the salt in the ink is 0.005 mol/L or more and 0.06 mol/L or less. The ink according to the present invention also requires that the content of glycerol in the ink is 35% by mass or more and 78% by mass or less based on the total content of the water-soluble organic solvents in the ink.

The present inventors presume the reason why the above-described effect is achieved by the constitution of the present invention to be as follows. First, the feature that the inhibition of the ink retention in the cap is achieved is considered to be as follows. As described above, the ink containing the phosphonic acid type self-dispersible pigment tends to be affected by the composition of the ink and also by environmental factors. For example, the composition of the ink is changed by evaporation of the ink, and the phosphonic acid group contained in the functional group on the surfaces of the pigment particles varies from a dissociated form to an H form when the pH of the ink is lowered, and so the dispersion stability of the phosphonic acid type self-dispersible pigment is lowered with the decrease in electric charge.

For such a phosphonic acid group, it is supposed that the aggregation of the phosphonic acid type self-dispersible pigment is relaxed by using glycerol in particular as a water-soluble organic solvent contained in the ink. In short, it is supposed that the aggregation of the phosphonic acid type self-dispersible pigment is relaxed while retaining excellent image characteristics owing to such a combined factor that glycerol is apt to be present between plural pigment particles due to its molecular structure and acts as a humectant.

The aggregation of the pigment is considered. In order to improve image characteristics, it is important to accelerate the aggregation of the pigment. On the other hand, in order to inhibit the ink retention in the cap, it is important to relax the aggregation of the pigment. In short, regarding the aggregation of the pigment, there is a trade-off between the improvement in the image characteristics and the inhibition of the ink retention in the cap. The aggregation of the pigment in a recording medium is caused by solid-liquid separation accelerated by a water-soluble organic solvent low in affinity for the salt and pigment in the ink after the ink is applied to the recording medium. The aggregation is also caused by evaporation of water in the ink and also by an interaction between the phosphonic acid group contained in the functional group and calcium contained in the recording medium, after the ink is applied to the recording medium. On the other hand, in order to inhibit the ink retention in the cap, it is only necessary not to allow calcium causing such an interaction as described above to be present and to inhibit the aggregation of the pigment in such a state that water is contained in the ink to some extent. In short, since these two phenomena are acceleration/relaxation of the aggregation of the pigment in different states of the ink, it is supposed that both excellent image characteristics and inhibition of the ink retention in the cap were able to be achieved in the ink according to the present invention that has the above-described constitution.

In the present invention, the self-dispersible pigment constituting the ink requires that the introduced amount of the functional group bonded to the surface of the pigment particle is 0.10 mmol/g or more and 0.33 mmol/g or less. If the introduced amount is less than 0.10 mmol/g, the storage stability of the ink cannot be achieved. If the introduced amount is more than 0.33 mmol/g on the other hand, the retention of the ink in the cap cannot be inhibited. In the case of such a conventional self-dispersible pigment to which an ionic group such as a carboxylic acid group is bonded, as investigated in Japanese Patent Application Laid-Open No. 2008-001891 and Japanese Patent Application Laid-Open No. 2006-089735, which is not the phosphonic acid type self-dispersible pigment, the improvement in the image density has been made by increasing the introduced amount of the functional group. This is attributable to the fact that a water-soluble organic solvent in an ink can be made hard to solvate the pigment by the influence of steric hindrance by the functional group and by lessening the area of a portion that has no bonded functional group on the surfaces of the pigment particles and has affinity for the water-soluble organic solvent in the ink. According to a further investigation by the present inventors, in the conventional self-dispersible pigment, to which an ionic group such as a carboxylic acid group is bonded, the retention of the ink in the cap did not occur even when the introduced amount of the functional group was increased for the purpose of improving the image density.

According to the investigation by the present inventors, however, it has been found that when the introduced amount of the phosphonic acid group is too high in the ink containing the phosphonic acid type self-dispersible pigment and glycerol, the ink may become easy to be retained in the cap in some cases. This is attributable to the fact that the phosphonic acid group has a plurality of pKa values as described above, which lie within a general pH range of the ink. In other words, this is attributable to the result thereof that the ink becomes sensitive to change in the pH of the ink when the introduced amount of the phosphonic acid group is too high.

According to a further investigation by the present inventors, the ink according to the present invention requires that the content of glycerol in the ink is 35% by mass or more and 78% by mass or less based on the total content of the water-soluble organic solvents in the ink in view of the effect thereof. If this proportion is less than 35% by mass or more than 78% by mass, it is difficult to achieve both the inhibition of the ink retention in the cap and the image performance, in particular, the bleeding resistance. Incidentally, the value of this proportion is a value rounded off to the first decimal place.

The ink according to the present invention requires to contain a polyoxyethylene alkyl ether that is a surfactant. The reason for this is that an excellent image density can be given by containing the polyoxyethylene alkyl ether in the ink, irrespective of the kind of the recording medium used.

The ink according to the present invention recites that the value (Concentration of anion)×(Valence number of anion) of the salt in the ink requires to be within a specific range. The reason why the present inventors have paid attention to the value (Concentration of anion)×(Valence number of anion) of the salt will now be described.

A self-dispersible pigment to the surface of a particle of which an ionic group is bonded generally has a counter ion, and this counter ion may be the same as the cation of the salt added to the ink in some cases. In addition, the concentration of the counter ion of the self-dispersible pigment to the surface of a particle of which an ionic group is bonded may vary according to the pH of the ink in the case of the phosphonic acid type self-dispersible pigment. Accordingly, attention is paid to the value (Concentration of anion)×(Valence number of anion) of the salt, whereby the relation between the image characteristics and the reliability of the ink can be more exactly grasped. Therefore, in the ink according to the present invention, the feature that the value (Concentration of anion)×(Valence number of anion) of the salt in the ink falls within the specific range is taken to exactly exhibit the effect thereof. Incidentally, the value (Concentration of anion)×(Valence number of anion) of the salt corresponds to the so-called normality. In the present invention, the value (Concentration of anion)×(Valence number of anion) of the salt in the ink according to the present invention requires to be 0.005 mol/L or more and 0.06 mol/L or less. If this value is less than 0.005 mol/L, good image characteristics are not achieved. If the value is more than 0.06 mol/L, the retention of the ink in the cap cannot be inhibited even when glycerol is contained so as to satisfy the above-described relation. In the present invention, the value (Concentration of anion)×(Valence number of anion) of the salt in the ink is particularly favorably 0.01 mol/L or more and 0.03 mol/L or less.

Ink:

Respective components constituting the ink according to the present invention and physical properties of the ink will hereinafter be described in detail.

Pigment:

Examples of the pigment include organic pigments and inorganic pigment such as carbon black, and any pigment may be used so far as it is usable for ink jet inks. A dye may also be used in combination with the pigment for purposes of color adjustment. In the present invention, it is particularly favorable to prepare a black ink using carbon black as the pigment. The content (% by mass) of the pigment in the ink is favorably 0.1% by mass or more and 15.0% by mass or less, more favorably 1.0% by mass or more and 10.0% by mass or less, based on the total mass of the ink.

The pigment used in the ink according to the present invention is a self-dispersible pigment to the surface of a particle of which a functional group containing at least a phosphonic acid group is bonded. Such a self-dispersible pigment is used, whereby the addition of a dispersant for dispersing the pigment in the ink can be rendered unnecessary, or the amount of the dispersant added can be lessened.

In the ink, the phosphonic acid group —$PO(O[M_1])_2$ may be in any state of a partially dissociated state and a wholly dissociated state. In short, the phosphonic acid group may take any form of —$PO_3H_2$ (acid type)-$PO_3H^-M_1^+$ (monobasic salt) and —$PO_3^{2-}(M_1^+)_2$ (dibasic salt). Here, $M_1$ is at least one selected from the group consisting of alkali metal, ammonium and organic ammonium. In the present invention, the functional group favorably contains 2 phosphonic acid groups. Needless to say, the image density can be improved even when a monophosphoric acid type self-dispersible pigment is used. More favorably, a bisphosphonic acid type self-dispersible pigment is used, whereby the bleeding resistance of an image to be formed can be more improved. Incidentally, it is not very favorable to use a trisphosphonic acid type self-dispersible pigment because the storage stability of the ink may not be sufficiently achieved in some cases. It is also favorable that the phosphonic acid group is located at the terminal of the functional group, namely, another atomic group is present between the surface of a pigment particle and the phosphonic acid group. Examples of said another atomic group (—R—) include a linear or branched alkylene group having 1 to 12 carbon atoms, an arylene group such as a phenylene and a naphthylene group, an amide group, a sulfonic group, an amino group, a carbonyl group, an ester group and an ether group. Groups formed by combining these groups may also be mentioned. Said another atomic group particularly favorably contains at least one of the alkylene group and the arylene group and a group having a hydrogen bonding property (amide group, sulfonic group, amino group, carbonyl group, ester group or ether group). In the present invention, the functional group particularly favorably contains —$C_6H_4$—CONH— (benzamide structure).

In the present invention, the functional group bonded to the surface of a pigment particle more favorably contains a structure of —$CQ(PO_3[M_1]_2)_2$. Here, Q in the formula is any one of a hydrogen atom, R, OR, SR and $NR_2$, and R is any one of a hydrogen atom, and alkyl, acyl, aralkyl and aryl groups. When R is a group containing a carbon atom, the number of carbon atoms contained in that group is favorably 1 to 18.

Specific examples of such a group include alkyl groups such as methyl and ethyl groups, acyl groups such as acetyl and benzoyl groups, aralkyl groups such as a benzyl group, and aryl groups such as phenyl and naphthyl groups. $M_1$ is at least one selected from the group consisting of a hydrogen atom, alkali metal, ammonium and organic ammonium. In the present invention, a functional group containing a structure of —CH(PO$_3$[M$_1$]$_2$)$_2$, which is the case where Q is a hydrogen atom, is particularly favorably bonded to the surfaces of the pigment particles.

Introduced Amount of Functional Group:

The ink according to the present invention requires that the introduced amount of the functional group bonded to the self-dispersible pigment is 0.10 mmol/g or more and 0.33 mmol/g or less as described above. The introduced amount is particularly favorably 0.25 mmol/g or more and 0.31 mmol/g or less. Incidentally, the unit of the introduced amount of the functional group is the number of millimoles of the functional group per 1 g of pigment solid content.

In the present invention, the introduced amount of the functional group bonded to the self-dispersible pigment can be measured by conducting quantitative analysis of phosphorus in the following manner. Specifically, a pigment dispersion liquid is first diluted with pure water in such a manner that the content (solid content) of the pigment is about 0.03% by mass to prepare a liquid A. The pigment dispersion liquid is ultra-centrifuged under conditions of 5° C., 80,000 rpm and 15 hours to collect a supernatant liquid from which the pigment has been removed, and this liquid is diluted about 80 times with pure water to prepare a liquid B. With respect to the thus obtained liquids A and B, quantitative analysis of phosphorus was performed by an ICP emission spectral analyzer, and the amount of the phosphonic acid group can be calculated out from a difference in the amount of phosphorus determined from the measured values of the liquids A and B. The introduced amount of the functional group in the pigment can be calculated out according to (amount of phosphonic acid group)/n (n denotes the number of phosphonic acid groups contained in one functional group, and is 1 for mono, 2 for bis and 3 for tris). When the number of phosphonic acid groups contained in the functional group is not known, the number can be known by analyzing the structure thereof by NMR. Incidentally, the measuring method using the pigment dispersion liquid has been described above. However, the measurement can be made likewise by using an ink. Needless to say, the measuring method of the introduced amount of the functional group is not limited to the method described above.

Salt Constituted by Combining Cation with Anion:

The ink according to the present invention contains a salt constituted by combining a cation with an anion. The cation is at least one selected from the group consisting of alkali metal ion, ammonium ion and organic ammonium ion. The anion is required to be at least one selected from the group consisting of Cl$^-$, Br$^-$, I$^-$, ClO$^-$, ClO$_2^-$, ClO$_3^-$, ClO$_4^-$, NO$_2^-$, NO$_3^-$, SO$_4^{2-}$, CO$_3^{2-}$, HCO$_3^-$, HCOO$^-$, (COO$^-$)$_2$, COOH(COO$^-$), CH$_3$COO$^-$, C$_2$H$_4$(COO$^-$)$_2$, C$_6$H$_5$COO$^-$, C$_6$H$_4$ (COO$^-$)$_2$, PO$_4^{3-}$, HPO$_4^{2-}$ and H$_2$PO$_4^-$. The form of the salt in the ink may be in any state of a partially dissociated state and a wholly dissociated state. Such a salt is used, whereby the reliability of the ink and the image characteristics can be reconciled at a high level.

Examples of the salt usable in the ink according to the present invention constituted by combining the cation with anion include the following salts: (M$_2$)Cl, (M$_2$)Br, (M$_2$)I, (M$_2$)ClO, (M$_2$)ClO$_2$, (M$_2$)ClO$_3$, (M$_2$)ClO$_4$, (M$_2$)NO$_2$, (M$_2$)NO$_3$, (M$_2$)$_2$SO$_4$, (M$_2$)$_2$CO$_3$, (M$_2$)HCO$_3$, HCOO(M$_2$), (COOM$_2$)$_2$, COOH(COOM$_2$), CH$_3$COOM$_2$, C$_2$H$_4$(COOM$_2$)$_2$, C$_6$H$_5$COOM$_2$, C$_6$H$_4$(COOM$_2$)$_2$, (M$_2$)$_3$PO$_4$, (M$_2$)$_2$HPO$_4$ and (M$_2$)H$_2$PO$_4$. Incidentally, M$_2$ is at least one selected from the group consisting of alkali metal ion, ammonium ion and organic ammonium ion. Examples of the alkali metal ion include lithium, sodium and potassium ions.

In the present invention, the salt is favorably at least one selected from the group consisting of C$_6$H$_4$(COO(Na))$_2$, C$_6$H$_4$(COO(K))$_2$, C$_6$H$_4$(COO(NH$_4$))$_2$ and (NH$_4$)$_2$SO$_4$. The salt is particularly favorably at least one selected from the group consisting of C$_6$H$_4$(COO(K))$_2$, C$_6$H$_4$(COO(NH$_4$))$_2$ and (NH$_4$)$_2$SO$_4$. These salts are suitable because they further inhibit the retention of the ink in the cap. In the present invention, a salt whose solubility in 100 mL of water is 10 g or more at 25° C. is particularly favorably used. The reason for this is that when a salt having a solubility less than 10 g, such as potassium hydrogenoxalate, is used, the salt may deposit with the evaporation of the ink in the cap in some cases, and so the retention of the ink in the cap may not be sufficiently inhibited in some cases.

As described above, the ink according to the present invention requires that the value (Concentration of anion)×(Valence number of anion) of the salt in the ink is 0.005 mol/L or more and 0.06 mol/L or less. As described above, this unit corresponds to the so-called normality. Incidentally, when a plurality of salts is contained in the ink, the value (Concentration of anion)×(Valence number of anion) of each salt is determined, and the total value thereof is regarded as the value defined in the present invention. The content (% by mass) of the salt in the ink is favorably 0.05% by mass or more and 2.0% by mass or less based on the total mass of the ink though it varies according to the molecular weight of the salt. If the content is less than 0.05% by mass, the image density and bleeding resistance of an image formed on a recording medium high in permeability may not be simultaneously achieved in some cases. If the content is more than 2.0% by mass, the storage stability of the resulting ink may not be achieved in some cases.

Aqueous Medium:

The ink according to the present invention may contain an aqueous medium that is a mixed solvent of water and a water-soluble organic solvent, and the water-soluble organic solvent requires to contain at least glycerol. In addition, the ink according to the present invention requires that the content of glycerol in the ink is 35% by mass or more and 78% by mass or less based on the total content of the water-soluble organic solvent in the ink. The content (% by mass) of glycerol is favorably 6.0% by mass or more and 25.0% by mass or less, more favorably 8.0% by mass or more and 20.0% by mass or less, based on the total mass of the ink.

As the water-soluble organic solvent, may be used any of those usable in ink jet inks, such as alcohols, glycols, glycol ethers and nitrogen-containing compounds in addition to glycerol, and one or more of these water-soluble organic compounds may be contained in the ink. In the present invention, at least one selected from the group consisting of 2-pyrrolidone, trimethylolpropane and triethylene glycol is particularly favorably used in addition to glycerol. Incidentally, when the proportion of the content of glycerol to the total content of the water-soluble organic solvent, which is defined in the present invention, is calculated, the water-soluble organic solvent that is the denominator do not contain such additives as described below or the above-described salt. Aqueous solutions of water-soluble organic compounds, which are solid at ordinary temperature (25° C.), such as urea and derivatives thereof, trimethylolpropane, and trimethylolethane, exhibit the behavior as solvents or dispersion media for other ink components like general water-soluble organic solvents. Thus, the content of the water-soluble organic compound which is solid at ordinary temperature (25° C.) is also included in the total content of the water-soluble organic solvent. The content (% by mass) of the water-soluble organic solvent in the ink is favorably 20.0% by mass or more and 25.0% by mass or less based on the total mass of the ink. Incidentally, the content of the water-soluble organic solvent includes the content of the glycerol. Deionized water is favorably used as water. The content (% by mass) of water in the ink is favorably 40.0% by mass or more and 95.0% by mass or less based on the total mass of the ink.

Polyoxyethylene Alkyl Ether:

The ink according to the present invention requires to contain a polyoxyethylene alkyl ether that is a surfactant. In the ink according to the present invention, the dynamic surface tension thereof at a lifetime of 50 milliseconds at 25° C. is favorably 40 mN/m or more, more favorably 45 mN/m or more. By satisfying such property, the pigment can be caused to particularly efficiently be present on the surface of a recording medium to achieve higher image density irrespective of the kind of the recording medium. In order for the ink according to the present invention to satisfy the property of the dynamic surface tension, the polyoxyethylene alkyl ether is used. The polyoxyethylene alkyl ether used in the ink according to the present invention is particularly favorably that which has an HLB value of 13 or more and 20 or less as determined by the Griffin's method, and the number of carbon atoms in the alkyl group of which is 12 or more and 20 or less. The content (% by mass) of the polyoxyethylene alkyl ether in the ink is favorably 0.05% by mass or more and 2.0% by mass or less, more favorably 0.05% by mass or more and 1.0% by mass or less, based on the total mass of the ink.

In the present invention, the dynamic surface tension of the ink was measured by adopting a maximum bubble pressure method. According to this method, a maximum pressure required to release a bubble pushed out of a tip portion of a probe (capillary) dipped in a liquid to be measured is measured, and a surface tension is found from this pressure. In the present invention, "lifetime" means a time period from a point of time when a new surface is formed after a bubble has been released from the tip portion to a point of time of a maximum bubble pressure (a point of time when a curvature radius of the bubble becomes equal to a radius of the tip portion of the probe), upon the formation of the bubble at the tip portion of the probe in the maximum bubble pressure method.

Other Additives:

The ink according to the present invention may also contain various additives such as any other surfactant than the polyoxyethylene alkyl ether, a resin, a pH adjustor, an antifoaming agent, a rust preventive, a preservative, a mildewproofing agent, an antioxidant, an antireductant and a chelating agent, as needed.

Physical Properties of the Ink:

In the present invention, the viscosity of the ink is favorably 1.0 mP·s or more and 5.0 mP·s or less, more favorably 1.0 mP·s or more and 3.0 mP·s or less at 25° C. The static surface tension of the ink is favorably 28 mN/m or more and 45 mN/m or less at 25° C. The pH of the ink is favorably 5 or more and 9 or less at 25° C.

Ink Cartridge:

The ink cartridge according to the present invention has an ink and an ink storage portion storing the ink, and the ink stored in the ink storage portion is the above-described ink according to the present invention. The structure of the ink cartridge is such that the ink storage portion is formed by a negative pressure generating member storing chamber storing a negative pressure generating member for holding the ink in a state of being impregnated by a negative pressure, and an ink storage chamber storing the ink in a state of not being impregnated by the negative pressure generating member. The ink storage portion may also be so constructed that the whole amount of the ink is held in the state of being impregnated by the negative pressure generating member without having such an ink storage chamber as described above, or the whole amount of the ink is stored in the state of not being impregnated by the negative pressure generating member without having the negative pressure generating member. In addition, the ink cartridge may be constructed so as to have an ink storage portion and a recording head.

Ink Jet Recording Method and Ink Jet Recording Apparatus:

The ink jet recording method according to the present invention has a step of ejecting an ink from an ejection orifice of a recording head of an ink jet system to record an image on a recording medium, and a step of capping the ejection orifice of the recording head with a cap. In addition, the ink jet recording apparatus according to the present invention is equipped with an ink storage portion storing an ink, a unit for ejecting the ink from an ejection orifice of a recording head of an ink jet system to record an image on a recording medium and a cap for capping the ejection orifice of the recording head. As systems for ejecting the ink, are mentioned a system in which mechanical energy is applied to the ink and a system in which thermal energy is applied to the ink. In the present invention, the ink jet system utilizing the thermal energy is particularly favorably used. The processes of the ink jet recording method and units which can be provided in the ink jet recording apparatus may be those publicly known except that the ink according to the present invention is used.

The construction that caps the ejection orifices of the recording head in the ink jet recording method and ink jet recording apparatus according to the present invention will hereinafter be described. Incidentally, in the following description, an ejection orifice is described for the sake of brevity. However, a plurality of ejection orifices is provided for ejecting one ink to form a row of ejection orifices. When a plurality of inks is used, rows of ejection orifices are provided according to the number of inks. In the present invention, color inks (the coloring materials of which are dyes) are particularly favorably used as inks for providing an ink set combined with the ink according to the present invention (black ink the coloring material of which is pigment).

FIGURE typically illustrates a cleaning portion of an ink jet recording apparatus. In the cleaning portion, a cap M5010 is brought into contact with a face having an ejection orifice of a head (not illustrated) to cap the ejection orifice, whereby the evaporation of the ink can be inhibited. More specifically, a cap holder M5060 is lifted by a vertically driving mechanism (not illustrated) to bring the cap M5010 into contact under proper contact force with the face having the ejection orifice of the head, thereby conducting capping. When a pump M5000 is actuated in the capped state, a negative pressure is generated between the face having the ejection orifice and the cap M5010, and an ink is sucked from the ejection orifice through tubes M5070 and M5080 connected suction ports M5090 and M5100 to conduct cleaning of the recording head. An ink is ejected toward suction chambers M5020 and M5030 (preliminarily ejection), or an ink present on the cap M5010 is sucked under such a state that the cap is opened, whereby sticking of the ink on the recording head and other troubles can be inhibited. An ink absorbing member may also be provided in the interior of each suction chamber.

As described above, the construction in which a suction chamber formed by a peripheral wall portion M5040 is partitioned into 2 suction chambers M5020 and M5030 having an equal volume by a partition wall M5050 has been illustrated in FIGURE. However, the volumes of these suction chambers may be different from each other, or one suction chamber may be formed without providing the partition wall. The cap may be so constructed that rows of ejection orifices respectively ejecting a plurality of inks are capped collectively with one cap, or caps may be provided to cap the respective rows of ejection orifices ejecting the plurality of the inks.

EXAMPLES

The present invention will hereinafter be described in more detail by the following Examples, Reference Examples and Comparative Examples. However, the present invention is not limited by the following examples unless going beyond the gist of the present invention. Incidentally, all designations of "part" or "parts" and "%" as will be used below are based on mass unless expressly noted.

Preparation of Pigment Dispersion Liquid:

Introduced amount of functional group in pigment:

A method for measuring the introduced amount of a functional group in a pigment is first described. A pigment dispersion liquid was diluted with pure water in such a manner that the content of a pigment to be measured is about 0.03% to prepare a liquid A. The pigment dispersion liquid was ultracentrifuged under conditions of 5° C., 80,000 rpm and 15 hours to collect a supernatant liquid from which the phosphonic acid type self-dispersible pigment had been removed, and this liquid was diluted to about 80 times with pure water to prepare a liquid B. With respect to the thus obtained liquids A and B for measurement, quantitative analysis of phosphorus was performed by means of an ICP emission spectral analyzer (SPS5100, manufactured by SII NanoTechnology Inc.). The amount of the phosphonic acid group was then found from a difference in the amount of phosphorus between the liquids A and B, and this amount was divided by the number of phosphonic acid groups contained in one functional group to calculate out the introduced amount of the functional group in the surface of the pigment.

Pigment Dispersion Liquid 1:

20 grams (solid content) of carbon black, 7 mmol of monosodium ((4-aminobenzoylamino)-methane-1,1-diyl)bisphosphonate (treatment agent), 20 mmol of nitric acid and 200 mL of pure water were mixed. The carbon black used at this time had a specific surface area of 220 $m^2/g$ and a DBP oil absorption of 105 mL/100 g, and the mixing was conducted at room temperature and 6,000 rpm by means of a Silverson mixer. After 30 minutes, 20 mmol of sodium nitrite dissolved in a small amount of pure water was slowly added to this mixture. By this mixing, the temperature of the mixture reached 60° C., and a reaction was conducted for 1 hour in this state. Thereafter, the pH of the mixture was adjusted to 10 with an aqueous solution of sodium hydroxide. After 30 minutes, 20 mL of pure water was added, diafiltration was conducted by means of a spectrum membrane, the sodium ion was then replaced by an ammonium ion by an ion exchange method, and the content of the pigment was then adjusted to 10.0% to obtain a dispersion liquid. In this manner, a pigment dispersion liquid 1 in such a state that a self-dispersible pigment to the surface of a particle of which a ((4-aminobenzoylamino)-methane-1,1-diyl)bisphosphonic acid group the counter ion of which is ammonium had been bonded was dispersed in water was obtained. The introduced amount of the functional group was 0.27 mmol/g.

Pigment Dispersion Liquid 2:

Sodium alendronate was used to synthesize sodium (4-(4-aminobenzenesulfonylamino)-1-hydroxybutane-1,1-diyl)-bisphosphonate. At this time, monosodium (4-amino-1-hydroxybutane-1,1-diyl)bisphosphonate (product of Zentiva Co.) was used as sodium alendronate. 34 grams of the alendronate was added into 150 mL of pure water in a 500-mL beaker, and the pH of the liquid was adjusted to 11 with a concentrated aqueous solution of sodium hydroxide to dissolve the alendronate. 25 grams (110 mmol) of nitrophenylsulfonyl chloride dissolved in 100 mL of tetrahydrofuran was added dropwise into this solution. At this time, the aqueous solution of sodium hydroxide was additionally added to keep the pH of the liquid at 10 to 11. After completion of the drop, this liquid was stirred additionally for 2 hours at room temperature. Thereafter, tetrahydrofuran was evaporated in vacuum, and the pH of this liquid was adjusted to 4 to deposit solids. After cooling overnight at 4° C., the solids were separated by filtration, washed with pure water and dried to obtain sodium (4-(4-aminobenzenesulfonylamino)-1-hydroxybutane-1,1-diyl)bisphosphonate.

20 grams (solid content) of carbon black, 7 mmol of sodium (4-(4-aminobenzenesulfonylamino)-1-hydroxybutane-1,1-diyl)bisphosphonate (treatment agent) obtained above, 20 mmol of nitric acid and 200 mL of pure water were mixed. The carbon black used at this time had a specific surface area of 220 $m^2/g$ and a DBP oil absorption of 105 mL/100 g, and the mixing was conducted at room temperature and 6,000 rpm by means of a Silverson mixer. After 30 minutes, 20 mmol of sodium nitrite dissolved in a small amount of pure water was slowly added to this mixture. By this mixing, the temperature of the mixture reached 60° C., and a reaction was conducted for 1 hour in this state. Thereafter, the pH of the mixture was adjusted to 10 with an aqueous solution of sodium hydroxide. After 30 minutes, 20 mL of pure water was added, diafiltration was conducted by means of a spectrum membrane, the sodium ion was then replaced by an ammonium ion by an ion exchange method, and the content of the pigment was then adjusted to 10.0% to obtain a dispersion liquid. In this manner, a pigment dispersion liquid 2 in such a state that a self-dispersible pigment to the surface of a particle of which a ((4-aminobenzenesulfonylamino)-1-hydroxybutane-1,1-diyl)-bisphosphonic acid group that a counter ion is ammonium had been bonded was dispersed in water, which was used in Comparative Examples, was obtained. The introduced amount of the functional group was 0.26 mmol/g.

Pigment Dispersion Liquid 3:

A pigment dispersion liquid 3 was obtained in the same manner as in the preparation of the pigment dispersion liquid 1 except that the amount of the treatment agent used was changed from 7 mmol to 9 mmol. The introduced amount of the functional group was 0.33 mmol/g.

Pigment Dispersion Liquid 4:

A pigment dispersion liquid 4 was obtained in the same manner as in the preparation of the pigment dispersion liquid 1 except that the amount of the treatment agent used was changed from 7 mmol to 1 mmol. The introduced amount of the functional group was 0.10 mmol/g.

Pigment Dispersion Liquid 5:

A pigment dispersion liquid 5 was obtained in the same manner as in the preparation of the pigment dispersion liquid 1 except that the amount of the treatment agent used was changed from 7 mmol to 10 mmol. The introduced amount of the functional group was 0.35 mmol/g.

Pigment Dispersion Liquid 6:

A pigment dispersion liquid 6 was obtained in the same manner as in the preparation of the pigment dispersion liquid 1 except that the amount of the treatment agent used was changed from 7 mmol to 0.8 mmol. The introduced amount of the functional group was 0.08 mmol/g.

Pigment Dispersion Liquid 7:

A dispersion liquid was prepared in the same manner as in the pigment dispersion liquid 1 except that the amount and kind of the treatment agent used in the preparation of the pigment dispersion liquid 1 were changed to 6 mmol of 4-aminobenzylphosphonic acid. At this time, a product of Sigma-Aldrich Co. was used as 4-aminobenzylphosphonic acid. In addition, the sodium ion was replaced by a potassium ion by an ion exchange method to obtain a pigment dispersion liquid 7 in such a state that a self-dispersible pigment to the surface of a particle of which a —$C_6H_4$—($PO(OK)_2$) group had been bonded was dispersed in water, according to the same procedure as in the pigment dispersion liquid 1. The introduced amount of the functional group was 0.28 mmol/g.

Pigment Dispersion Liquid 8:

A pigment dispersion liquid 8 was obtained in the same manner as in the preparation of the pigment dispersion liquid 1 except that the sodium ion was replaced by a potassium ion by an ion exchange method. A ((4-aminobenzoylamino)-1-methane-1,1-diyl)bisphosphonic acid group the counter ion of which is potassium was bonded to the surfaces of the pigment particles in the resultant pigment dispersion liquid 8. The introduced amount of the functional group was 0.27 mmol/g.

Pigment Dispersion Liquid 9:

Under being cooled to 5° C., 1.5 g of 4-amino-phthalic acid (treatment agent) was added into a solution of 5 g of concentrated hydrochloric acid dissolved in 5.5 g of water. A container containing this solution was then placed in an ice bath, and the solution was stirred, thereby laying this solution in a state of always being cooled to 10° C. or less. A solution of 2.2 g of potassium nitrite dissolved in 9 g of water at 5° C. was added into this solution. After this solution was stirred additionally for 15 minutes, 6 g (solid content) of carbon black (specific surface area: 220 $m^2$/g, DBP oil absorption: 105 mL/100 g) was added into this solution under stirring. Thereafter, stirring was conducted additionally for 15 minutes. The resultant slurry was filtered through filter paper (trade name: Standard Filter Paper No. 2; product of Advantec Co.), the resultant particles were fully washed with water and dried in an oven of 110° C. Pure water was added into the particles in such a manner that the content of the pigment was 10.0%, thereby obtaining a dispersion liquid. In this manner, a pigment dispersion liquid 1 in such a state that a self-dispersible pigment to the surface of a particle of which a —$C_6H_3$—$(COOK)_2$ group had been bonded was dispersed in water was obtained. The introduced amount of the functional group determined by measuring the potassium ion concentration in this pigment dispersion liquid 9 by means of an ion meter (manufactured by DKK) and converting the potassium ion concentration thus obtained was 0.68 mmol/g.

Preparation of Ink:

After the components (Unit: %) shown in the upper portion of Table 1 were mixed and sufficiently stirred, the resultant respective mixtures were filtered under pressure through a polypropylene filter (product of Pall Corporation) having a pore size of 2.5 μm, thereby preparing respective inks. In Table 1, "NIKKOL BL-9EX" is polyoxyethylene lauryl ether produced by Nikko Chemicals Co., Ltd. and is a surfactant whose HLB value is 13.6 as determined by the Griffin's method, and the number of moles of the ethylene oxide group added to which is 9. In Table 1, "Surfynol 465" is an acetylene glycol ethylene oxide adduct produced by Air Products Co. and is a surfactant, the number of moles of the ethylene oxide group added to which is 10.

Properties of the respective inks are also shown collectively in the lower portion of Table 1. In addition, with respect to the respective inks, the dynamic surface tensions at 25° C. were measured by means of Bubble Pressure Tensiometer BP2 MK2 (manufactured by Kruss Co.) utilizing the maximum bubble pressure method. An ink whose dynamic surface tension at a lifetime of 50 milliseconds was 40 mN/m or more was ranked as A, and an ink whose dynamic surface tension was less than 40 mN/m was ranked as B. The results thereof are shown in Table 1.

Incidentally, in Table 1, "(concentration of anion)×(valence number of anion) (mol/L) of salt" was calculated out as follows: value (mol/L) (Concentration of anion)×(Valence number of anion) of the salt=(Amount of anion used)/Molecular weight×Valence number×10.

TABLE 1

| | Composition of ink | | | | | | | | | |
|---|---|---|---|---|---|---|---|---|---|---|
| | Example | | | | | | | | | |
| | 1 | 2 | 3 | 4 | 5 | 6 | 7 | 8 | 9 | 10 |
| Pigment dispersion 1 | 30.00 | 30.00 | | | | | | | | |
| Pigment dispersion 2 | | | | | | | | | | 30.00 |
| Pigment dispersion 3 | | | | | | | | | | |
| Pigment dispersion 4 | | | | | | | | | | |
| Pigment dispersion 5 | | | | | | | | | | |
| Pigment dispersion 6 | | | | | | | | | | |
| Pigment dispersion 7 | | | | | | | | | 30.00 | |
| Pigment dispersion 8 | | | 30.00 | 30.00 | 30.00 | 30.00 | 30.00 | 30.00 | | |
| Pigment dispersion 9 | | | | | | | | | | |
| Glycerol | 15.00 | 15.00 | 15.00 | 15.00 | 15.00 | 15.00 | 15.00 | 15.00 | 15.00 | 15.00 |
| 2-Pyrrolidone | 5.00 | 5.00 | 5.00 | 5.00 | 5.00 | 5.00 | 5.00 | 5.00 | 5.00 | 5.00 |
| Trimethylolpropane | 3.00 | 3.00 | 3.00 | 3.00 | 3.00 | 3.00 | 3.00 | 3.00 | 3.00 | 3.00 |
| Triethylene glycol | | | | | | | | | | |
| Polyethylene glycol | | | | | | | | | | |
| 1,5-Pentanediol | | | | | | | | | | |
| Diethylene glycol | | | | | | | | | | |
| NIKKOL BL-9EX | 0.15 | 0.15 | 0.15 | 0.15 | 0.15 | 0.15 | 0.15 | 0.15 | 0.15 | 0.15 |
| Surfynol 465 | | | | | | | | | | |
| Ammonium phthalate (200.19) | 0.30 | | | | | | | | | 0.30 |

TABLE 1-continued

| Composition of ink | | | | | | | | | | |
|---|---|---|---|---|---|---|---|---|---|---|
| Ammonium sulfate (132.14) | | 0.20 | | | | | | | | |
| Potassium phthalate (242.31) | | | 0.36 | | | | | | 0.36 | |
| Potassium sulfate (174.26) | | | | 0.26 | | | | | | |
| Potassium chloride (74.55) | | | | | 0.23 | | | | | |
| Potassium acetate (98.14) | | | | | | 0.30 | | | | |
| Potassium phosphate (212.27) | | | | | | | 0.21 | | | |
| Potassium hydrogen-oxalate (128.13) | | | | | | | | 0.39 | | |
| Pure water | 46.55 | 46.65 | 46.49 | 46.59 | 46.62 | 46.55 | 46.64 | 46.46 | 46.49 | 46.55 |
| Content of glycerol A [%] | 15.00 | 15.00 | 15.00 | 15.00 | 15.00 | 15.00 | 15.00 | 15.00 | 15.00 | 15.00 |
| Total content of water-soluble organic solvents B [%] | 23.0 | 23.0 | 23.0 | 23.0 | 23.0 | 23.0 | 23.0 | 23.0 | 23.0 | 23.0 |
| A/B × 100 [%] | 65 | 65 | 65 | 65 | 65 | 65 | 65 | 65 | 65 | 65 |
| Anion concentration × Anion valence number [mol/L] | 0.03 | 0.03 | 0.03 | 0.03 | 0.03 | 0.03 | 0.03 | 0.03 | 0.03 | 0.03 |
| Dynamic surface tension | A | A | A | A | A | A | A | A | A | A |

| | Example | | | | | | | | | |
|---|---|---|---|---|---|---|---|---|---|---|
| | 11 | 12 | 13 | 14 | 15 | 16 | 17 | 18 | 19 | 20 |
| Pigment dispersion 1 | 30.00 | 30.00 | 30.00 | 30.00 | 30.00 | 30.00 | 30.00 | 30.00 | 30.00 | 30.00 |
| Pigment dispersion 2 | | | | | | | | | | |
| Pigment dispersion 3 | | | | | | | | | | |
| Pigment dispersion 4 | | | | | | | | | | |
| Pigment dispersion 5 | | | | | | | | | | |
| Pigment dispersion 6 | | | | | | | | | | |
| Pigment dispersion 7 | | | | | | | | | | |
| Pigment dispersion 8 | | | | | | | | | | |
| Pigment dispersion 9 | | | | | | | | | | |
| Glycerol | 9.00 | 10.00 | 15.00 | 15.00 | 10.00 | 10.00 | 10.00 | 10.00 | 10.00 | 8.00 |
| 2-Pyrrolidone | 5.00 | 5.00 | 5.00 | 5.00 | 5.00 | 13.00 | 5.00 | | | 5.00 |
| Trimethylolpropane | 4.00 | 5.00 | 5.00 | 7.00 | 8.00 | | | | | 10.00 |
| Triethylene glycol | | | | | | | 8.00 | | | |
| Polyethylene glycol | | | | | | | | 13.00 | | |
| 1,5-Pentanediol | | | | | | | | | 13.00 | |
| Diethylene glycol | | | | | | | | | | |
| NIKKOL BL-9EX | 0.15 | 0.15 | 0.15 | 0.15 | 0.15 | 0.15 | 0.15 | 0.15 | 0.15 | 0.15 |
| Surfynol 465 | | | | | | | | | | |
| Ammonium phthalate (200.19) | 0.30 | 0.30 | 0.30 | 0.30 | 0.40 | 0.40 | 0.40 | 0.40 | 0.40 | 0.30 |
| Ammonium sulfate (132.14) | | | | | | | | | | |
| Potassium phthalate (242.31) | | | | | | | | | | |
| Potassium sulfate (174.26) | | | | | | | | | | |
| Potassium chloride (74.55) | | | | | | | | | | |
| Potassium acetate (98.14) | | | | | | | | | | |
| Potassium phosphate (212.27) | | | | | | | | | | |
| Potassium hydrogen-oxalate (128.13) | | | | | | | | | | |
| Pure water | 51.55 | 49.55 | 44.55 | 42.55 | 46.45 | 46.45 | 46.45 | 46.45 | 46.45 | 46.55 |
| Content of glycerol A [%] | 9.00 | 10.00 | 15.00 | 15.00 | 10.00 | 10.00 | 10.00 | 10.00 | 10.00 | 8.00 |
| Total content of water-soluble organic solvents B [%] | 18.0 | 20.0 | 25.0 | 27.0 | 23.0 | 23.0 | 23.0 | 23.0 | 23.0 | 23.0 |
| A/B × 100 [%] | 50 | 50 | 60 | 56 | 43 | 43 | 43 | 43 | 43 | 35 |
| Anion concentration × Anion valence number [mol/L] | 0.03 | 0.03 | 0.03 | 0.03 | 0.04 | 0.04 | 0.04 | 0.04 | 0.04 | 0.03 |

TABLE 1-continued

| Composition of ink | | | | | | | | | | |
|---|---|---|---|---|---|---|---|---|---|---|
| Dynamic surface tension | A | A | A | A | A | A | A | A | A | A |

| | Example | | | | |
|---|---|---|---|---|---|
| | 21 | 22 | 23 | 24 | 25 |
| Pigment dispersion 1 | 30.00 | | | 30.00 | 30.00 |
| Pigment dispersion 2 | | | | | |
| Pigment dispersion 3 | | | 30.00 | | |
| Pigment dispersion 4 | | 30.00 | | | |
| Pigment dispersion 5 | | | | | |
| Pigment dispersion 6 | | | | | |
| Pigment dispersion 7 | | | | | |
| Pigment dispersion 8 | | | | | |
| Pigment dispersion 9 | | | | | |
| Glycerol | 18.00 | 15.00 | 15.00 | 15.00 | 15.00 |
| 2-Pyrrolidone | 5.00 | 5.00 | 5.00 | 5.00 | 5.00 |
| Trimethylolpropane | | 3.00 | 3.00 | 3.00 | 3.00 |
| Triethylene glycol | | | | | |
| Polyethylene glycol | | | | | |
| 1,5-Pentanediol | | | | | |
| Diethylene glycol | | | | | |
| NIKKOL BL-9EX | 0.15 | 0.15 | 0.15 | 0.15 | 0.15 |
| Surfynol 465 | | | | | |
| Ammonium phthalate (200.19) | 0.30 | 0.30 | 0.30 | 0.05 | 0.60 |
| Ammonium sulfate (132.14) | | | | | |
| Potassium phthalate (242.31) | | | | | |
| Potassium sulfate (174.26) | | | | | |
| Potassium chloride (74.55) | | | | | |
| Potassium acetate (98.14) | | | | | |
| Potassium phosphate (212.27) | | | | | |
| Potassium hydrogen-oxalate (128.13) | | | | | |
| Pure water | 46.55 | 46.55 | 46.55 | 46.80 | 46.25 |
| Content of glycerol A [%] | 18.00 | 15.00 | 15.00 | 15.00 | 15.00 |
| Total content of water-soluble organic solvents B [%] | 23.0 | 23.0 | 23.0 | 23.0 | 23.0 |
| A/B × 100 [%] | 78 | 65 | 65 | 65 | 65 |
| Anion concentration × Anion valence number [mol/L] | 0.03 | 0.03 | 0.03 | 0.005 | 0.06 |
| Dynamic surface tension | A | A | A | A | A |

| | Comparative Example | | | Reference Example | | | | | | | |
|---|---|---|---|---|---|---|---|---|---|---|---|
| | 1 | 2 | 3 | 1 | 2 | 3 | 4 | 5 | 6 | 7 | 8 |
| Pigment dispersion 1 | 30.00 | 30.00 | 30.00 | | | 30.00 | 30.00 | 30.00 | 30.00 | | |
| Pigment dispersion 2 | | | | | | | | | | | |
| Pigment dispersion 3 | | | | | | | | | | | |
| Pigment dispersion 4 | | | | | | | | | | | |
| Pigment dispersion 5 | | | | | 30.00 | | | | | | |
| Pigment dispersion 6 | | | | 30.00 | | | | | | | |
| Pigment dispersion 7 | | | | | | | | | | | |
| Pigment dispersion 8 | | | | | | | | | | 30.00 | 30.00 |
| Pigment dispersion 9 | | | | | | | | | | | |
| Glycerol | 15.00 | | 7.00 | 15.00 | 15.00 | 15.00 | 7.00 | 19.00 | 15.00 | 15.00 | 6.00 |
| 2-Pyrrolidone | 5.00 | 7.00 | | 5.00 | 5.00 | 5.00 | 5.00 | 4.00 | 5.00 | 5.00 | 5.00 |
| Trimethylolpropane | 3.00 | 5.00 | 7.00 | 3.00 | 3.00 | 3.00 | 11.00 | | 3.00 | 3.00 | 12.00 |
| Triethylene glycol | | | | | | | | | | | |
| Polyethylene glycol | | | | | | | | | | | |
| 1,5-Pentanediol | | 7.00 | | | | | | | | | |
| Diethylene glycol | | | 5.00 | | | | | | | | |
| NIKKOL BL-9EX | 0.15 | | | 0.15 | 0.15 | 0.15 | 0.15 | 0.15 | | 0.15 | 0.15 |
| Surfynol 465 | | 2.00 | 1.00 | | | | | | 0.15 | | |

TABLE 1-continued

| Composition of ink | | | | | | | | | | | |
|---|---|---|---|---|---|---|---|---|---|---|---|
| Ammonium phthalate (200.19) | 0.04 | | | 0.30 | 0.30 | 0.70 | 0.30 | 0.30 | 0.30 | | |
| Ammonium sulfate (132.14) | | | | | | | | | | | |
| Potassium phthalate (242.31) | | | | | | | | | | 0.60 | 0.60 |
| Potassium sulfate (174.26) | | | | | | | | | | | |
| Potassium chloride (74.55) | | | | | | | | | | | |
| Potassium acetate (98.14) | | | | | | | | | | | |
| Potassium phosphate (212.27) | | | | | | | | | | | |
| Potassium hydrogen-oxalate (128.13) | | | | | | | | | | | |
| Pure water | 46.81 | 49.00 | 50.00 | 46.55 | 46.55 | 46.15 | 46.55 | 46.55 | 46.55 | 46.25 | 46.25 |
| Content of glycerol A [%] | 15.00 | 0.00 | 7.00 | 15.00 | 15.00 | 15.00 | 7.00 | 19.00 | 15.00 | 15.00 | 6.00 |
| Total content of water-soluble organic solvents B [%] | 23.0 | 19.0 | 19.0 | 23.0 | 23.0 | 23.0 | 23.0 | 23.0 | 23.0 | 23.0 | 23.0 |
| A/B × 100 [%] | 65 | 0 | 37 | 65 | 65 | 65 | 30 | 83 | 65 | 65 | 26 |
| Anion concentration × Anion valence number [mol/L] | 0.004 | 0.00 | 0.00 | 0.03 | 0.03 | 0.07 | 0.03 | 0.03 | 0.03 | 0.05 | 0.05 |
| Dynamic surface tension | A | B | B | A | A | A | A | A | B | A | A |

Evaluations of Ink:

Image Density:

An ink cartridge charged with each of the inks obtained above was set in an ink jet recording apparatus PIXUS MP480 (trade name, manufactured by Canon Inc.), in which a recording head ejecting an ink by thermal energy was installed. Incidentally, in the above-described ink jet recording apparatus, the conditions where the resolution is 600 dpi×600 dpi, and one ink droplet whose mass is 25 ng±10% is applied to a unit region of 1/600 inch×1/600 inch are defined as a recording duty of 100%. A solid image (2 cm×2 cm/line) with a recording duty of 100% was recorded on the following 3 recording media (plain paper). As the recording media, were used GF-500 and Canon Extra Multifunctional Paper (both, products of Canon Inc.), and Bright White Inkjet Paper (product of Hewlett Packard Co.). After one day from the recording, image densities of the solid images on the 3 recording media were measured by means of a reflection densitometer Macbeth RD-918 (manufactured by Macbeth Co.) to make evaluation as to the image density with average values and minimum values thereof. The evaluation criteria are as follows. The results are shown in Table 2. In the present invention, A in the following evaluation criteria was regarded as an acceptable level, and B and C were regarded as an unacceptable level.

A: The average value was 1.5 or more, and the minimum value was 1.3 or more;

B: The average value was 1.4 or more and less than 1.5, and the minimum value was 1.3 or more;

C: The minimum value was less than 1.3.

Bleeding Resistance:

Each of the inks (black inks) obtained above and an yellow ink of BC-71 Color (product of Canon Inc.) were used to evaluate the black inks as to the bleeding resistance in the following manner. Incidentally, the yellow ink of BC-71 is a color ink containing a dye as a coloring material. An ink cartridge charged with each color ink was set in an ink jet recording apparatus PIXUS MP480 (trade name, manufactured by Canon Inc.), in which a recording head ejecting an ink by thermal energy was installed. Incidentally, in the above-described ink jet recording apparatus, with a resolution is 600 dpi×600 dpi and to a unit region of 1/600×1/600 in, the condition where one ink droplet of the black ink whose mass is 30 ng±10%, is applied and the condition where two ink droplets of the yellow ink the mass of one droplet of which is 5.5 ng±10% is applied are respectively defined as a recording duty of 100%. A black solid image (2 cm×2 cm) with a recording duty of 100% and a yellow solid image (2 cm×2 cm) with a recording duty of 70% were recorded adjoiningly on a recording medium (GF-500, product of Canon Inc). The resultant images were visually observed to make the evaluation of the bleeding resistance. The evaluation criteria are as follows. The results are shown in Table 2. In the present invention, AA and A in the following evaluation criteria were regarded as an acceptable level, and B and C were regarded as an unacceptable level.

AA: No bleeding was observed;

A: Bleeding occurred, but was scarcely conspicuous;

B: Bleeding considerably occurred;

C: Bleeding occurred to such an extent that a border between the 2 color images is not found.

Inhibition of Ink Retention in Cap:

Each of the inks obtained above was placed in an open container to prepare a liquid with 10% of the ink evaporated (concentrated ink). The resultant concentrated ink was used to record a black solid image with a recording duty of 7% on 3,000 sheets of A4-sized recording media at an interval of 4 minutes under an environment of 30° C. temperature and 10% relative humidity by the same ink jet recording apparatus as that used in the evaluation of the image density. When this recording was conducted, 0.21 mg±10% of the ink was preliminarily ejected on a cap before the recording, and 0.1 g±30% of the ink was sucked through the cap capping ejection orifices of the recording head at an interval of once per 100 recording media as a cleaning operation. With respect to an ink ranked as B in the result of the evaluation according to the following evaluation criteria, the recording was conducted additionally on 2,000 sheets of recording media to regard the evaluation result as A. With respect to an ink ranked as A in the result of the evaluation, the recording was conducted additionally on 2,000 sheets of recording media, and the condition of the cap at this point of time was visually observed to evaluate whether the retention of the ink in the cap was inhibited or not. The evaluation criteria are as follows. The results are shown in Table 2. In the present invention, AA, A and B were regarded as an acceptable level, and C was regarded as an unacceptable level because a problem may occur upon the recording in some cases. The reason why the concentrated ink was used for the evaluation is that the retention of the ink in the cap is evaluated under severer conditions, thereby confirming that the inks according to Examples of the present invention have sufficiently excellent performance in the inhibition of the retention in the cap.

AA: No retention of the ink in the cap was observed even after the recording on 7,000 sheets of recording media;
A: No retention of the ink in the cap was observed even after the recording on 5,000 sheets of recording media;
B: No retention of the ink in the cap was observed even after the recording on 3,000 sheets of recording media;
C: Retention of the ink in the cap was observed after the recording on 3,000 sheets of recording media.

Storage Stability:

After each of the inks obtained above was stored for one week under an environment of 80° C. temperature, the ink was filtered again through the same filter as that used in the preparation of the ink to compare the inks before and after the storage (upon the preparation of the ink and after the storage) as to filterability, thereby evaluating the ink as to the storage stability. The evaluation criteria are as follows. The results are shown in Table 2. An ink having sufficient performance in filterability indicates the storage stability of the ink is also not lowered. In the present invention, A and B in the following evaluation criteria were regarded as an acceptable level, and C was regarded as an unacceptable level.

A: Filterabilities before and after the storage were equivalent;
B: Filterability after the storage was lowered compared with the ink before the storage, but the ink could be filtered without a problem;
C: Filterability after the storage was lowered compared with the ink before the storage, and clogging was caused during the filtration after the storage.

TABLE 2

|  |  | Evaluation results | | | |
|---|---|---|---|---|---|
|  |  | Image characteristics | | Reliability of ink | |
|  |  | Image density | Bleeding resistance | Inhibition of ink retention in cap | Storage stability |
| Example | 1 | A | AA | AA | A |
|  | 2 | A | AA | AA | A |
|  | 3 | A | AA | A | A |
|  | 4 | A | AA | A | A |
|  | 5 | A | AA | A | A |
|  | 6 | A | AA | A | A |
|  | 7 | A | AA | A | A |
|  | 8 | A | AA | B | A |
|  | 9 | A | A | AA | A |
|  | 10 | A | AA | AA | B |
|  | 11 | A | AA | A | A |
|  | 12 | A | AA | AA | A |
|  | 13 | A | AA | AA | A |
|  | 14 | A | A | A | A |
|  | 15 | A | AA | A | A |
|  | 16 | A | AA | A | A |
|  | 17 | A | AA | A | A |
|  | 18 | A | AA | B | B |
|  | 19 | A | AA | B | B |
|  | 20 | A | AA | A | A |
|  | 21 | A | A | AA | A |
|  | 22 | A | AA | AA | B |
|  | 23 | A | A | A | A |
|  | 24 | A | A | AA | A |
|  | 25 | A | AA | B | B |
| Comp. Ex. | 1 | A | B | AA | A |
|  | 2 | C | A | A | B |
|  | 3 | C | A | A | A |
| Reference Example | 1 | A | AA | AA | C |
|  | 2 | A | A | C | B |
|  | 3 | A | AA | C | C |
|  | 4 | A | AA | C | B |
|  | 5 | A | B | AA | A |
|  | 6 | B | AA | AA | A |
|  | 7 | B | AA | AA | A |
|  | 8 | B | AA | B | A |

Inks using other salts (having a solubility of 10 g or more in 100 mL of water at 25° C.) of the various anions specified in the present invention than those used in Examples were also evaluated in the same manner as in Example 2. Specifically, evaluations were made in the same manner as described above except that the anion of the salt in Example 2 varied. As a result, almost the same results as those of Example 2 were yielded even in the salts of any anions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-174066, filed Aug. 3, 2010, which is hereby incorporated by reference herein in its entirety.

What is claimed is:

1. An ink jet ink comprising a self-dispersible pigment, a salt, a polyoxyethylene alkyl ether and a water-soluble organic solvent,
wherein the self-dispersible pigment is a pigment to a surface of a particle of which a functional group containing at least a phosphonic acid group is bonded, the introduced amount of the functional group bonded to the self-dispersible pigment is 0.10 mmol/g or more and 0.33 mmol/g or less,
wherein the salt is constituted by combining at least one cation selected from the group consisting of alkali metal ion, ammonium ion and organic ammonium ion with at least one anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$ and $H_2PO_4^-$, and the value (Concentration of anion)×(Valence number of anion) of the salt in the ink is 0.005 mol/L or more and 0.06 mol/L or less, and
wherein the water-soluble organic solvent includes glycerol, a content of the glycerol in the ink is 35% by mass or more and 78% by mass or less based on the total content of the water-soluble organic solvent in the ink.

2. The ink according to claim 1, wherein the functional group has at least two phosphonic acid groups.

3. The ink according to claim 1, wherein the content of the water-soluble organic solvents in the ink is 20.0% by mass or more and 25.0% by mass or less based on the total mass of the ink.

4. The ink according to claim 1, wherein a solubility of the salt in 100 mL of water is 10 g or more at 25° C.

5. An ink cartridge comprising an ink and an ink storage portion storing the ink, wherein the ink is the ink according to claim 1.

6. An ink jet recording method comprising a step of ejecting an ink from an ejection orifice of a recording head of an ink jet system to record an image on a recording medium, and a step of capping the ejection orifice of the recording head with a cap, wherein the ink is the ink according to claim 1.

7. An ink jet recording apparatus comprising an ink storage portion storing an ink, a unit for ejecting the ink from an ejection orifice of a recording head of an ink jet system to record an image on a recording medium and a cap for capping the ejection orifice of the recording head, wherein the ink is the ink according to claim 1.

8. The ink according to claim 1, wherein the at least one anion comprises $PO_4^{3-}$.

9. The ink according to claim 1, wherein the at least one anion comprises $COOH(COO^-)$.

\* \* \* \* \*